United States Patent
Chen

(10) Patent No.: US 8,145,256 B2
(45) Date of Patent: *Mar. 27, 2012

(54) SYSTEM, METHOD AND MOBILE UNIT TO SENSE OBJECTS OR TEXT AND RETRIEVE RELATED INFORMATION

(75) Inventor: Alexander C Chen, San Diego, CA (US)

(73) Assignee: RPX Corporation, San Francisco, CA (US)

( * ) Notice: Subject to any disclaimer, the term of this patent is extended or adjusted under 35 U.S.C. 154(b) by 408 days.

This patent is subject to a terminal disclaimer.

(21) Appl. No.: 12/267,568

(22) Filed: Nov. 8, 2008

(65) Prior Publication Data

US 2009/0061949 A1   Mar. 5, 2009

Related U.S. Application Data

(63) Continuation of application No. 11/245,606, filed on Oct. 6, 2005, now Pat. No. 7,450,960.

(60) Provisional application No. 60/616,256, filed on Oct. 7, 2004.

(51) Int. Cl.
   *H04B 1/38* (2006.01)

(52) U.S. Cl. .................................................. 455/550.1
(58) Field of Classification Search ............ 455/456.1, 455/456.2, 550.1, 561, 563, 566, 567, 575.1; 709/203, 207, 211, 212

See application file for complete search history.

(56) References Cited

U.S. PATENT DOCUMENTS

| | | | |
|---|---|---|---|
| 6,526,351 | B2 | 2/2003 | Whitham |
| 6,629,642 | B1 | 10/2003 | Swartz |
| 6,636,249 | B1 | 10/2003 | Rekimoto |
| 7,032,001 | B1 | 4/2006 | Herrod |
| 7,265,779 | B2 | 9/2007 | Sato |
| 7,305,434 | B2 | 12/2007 | Notsu |
| 7,340,079 | B2 | 3/2008 | Segawa |
| 2001/0056342 | A1 | 12/2001 | Piehn |
| 2004/0170325 | A1 | 9/2004 | Eichhorn |
| 2004/0252887 | A1 | 12/2004 | Lim |
| 2005/0197825 | A1 | 9/2005 | Hagerman |
| 2006/0111143 | A1* | 5/2006 | Pande et al. ............... 455/556.1 |

* cited by examiner

*Primary Examiner* — Thanh Le
(74) *Attorney, Agent, or Firm* — Howison & Arnott, L.L.P.

(57) ABSTRACT

A system, method and mobile unit to sense objects and/or text and retrieve related images, text or translations. The system may allow users to instantly access information about an object or text with a mobile device, such as a mobile phone, pager, personal digital assistant (PDA) or lap top computer.

39 Claims, 4 Drawing Sheets

Chen2

SYSTEM, METHOD AND MOBILE UNIT TO SENSE OBJECTS OR TEXT AND RETRIEVE RELATED INFORMATION

CLAIM OF PRIORITY UNDER 35 USC 119 AND 120

The present application is a continuation of co-owned U.S. patent application Ser. No. 11/245,606, filed on Oct. 6, 2005, now U.S. Pat. No. 7,450,960, issued on Nov. 11, 2008, which claims priority to co-owned U.S. Provisional Application No. 60/616,256, filed on Oct. 7, 2004, entitled "SYSTEM, METHOD AND MOBILE UNIT TO SENSE OBJECTS OR TEXT AND RETRIEVE RELATED IMAGES, TEXT OR TRANSLATIONS," which are hereby incorporated by reference in their entirety.

BACKGROUND

Some mobile phones currently have built-in cameras, which may be called camera phones. These camera phones allow a user to transmit images to other devices through a communication system.

SUMMARY

A system, method and mobile unit are described to sense objects and/or text and retrieve information related to the object or text, such as images, video, text or language translations. The system may allow users to instantly view or access information about an object or text with a mobile device, such as a mobile phone, pager, personal digital assistant (PDA) or lap top computer.

The system may be faster and more accurate than a system that only uses human searchers to find information related to an object or text. The system may use human searchers in addition to computer searchers.

Using images to identify objects or text may be faster and more accurate than a system that uses speech-recognition to describe and identify images or text because images may be more precise than words. As the saying goes, a picture may be better than a thousand words.

DETAILED DESCRIPTION

Communication System

Figure 1:
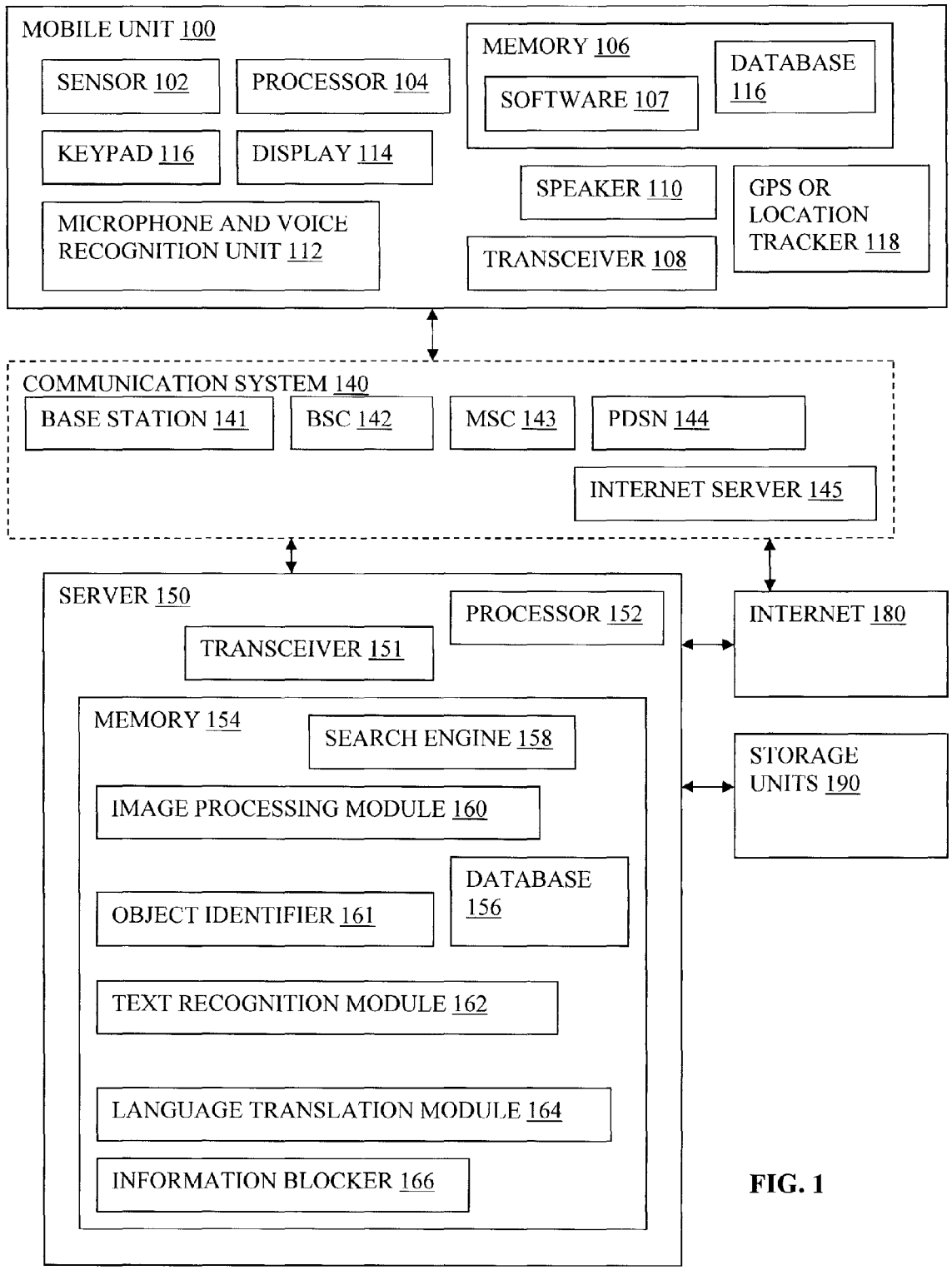
FIG. 1 illustrates a mobile unit, a communication system, a server, the Internet and storage units.
Figure 2:
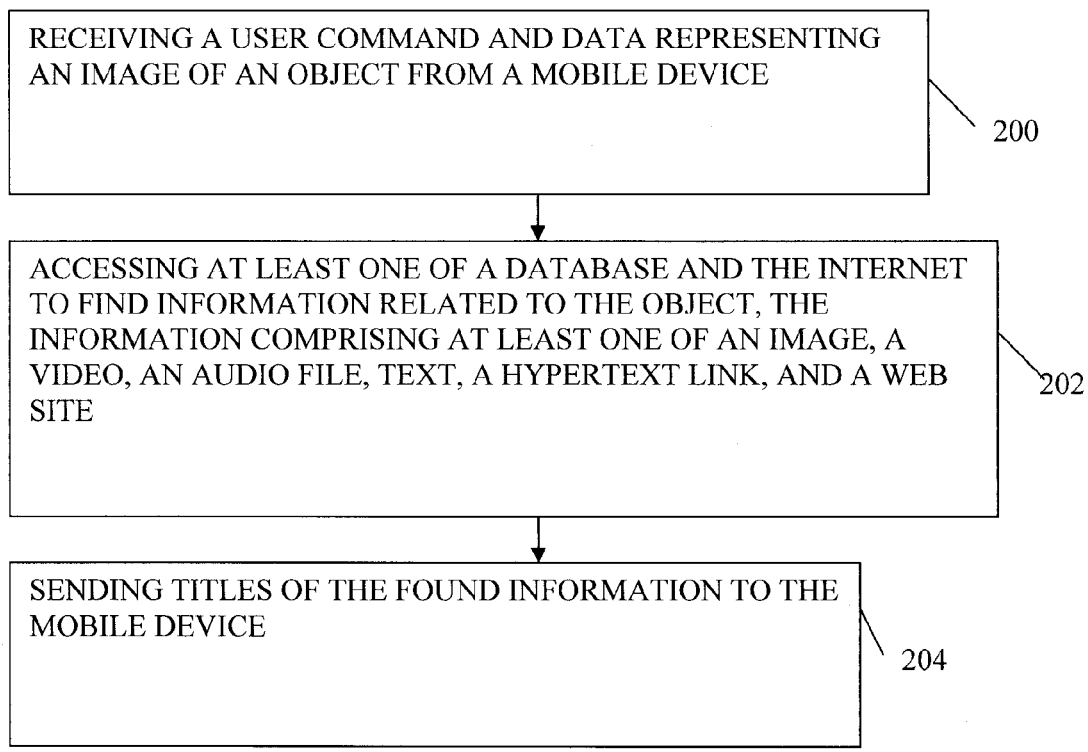
FIG. 2 illustrates a method of using the mobile unit, communication system and server of FIG. 1.
Figure 3:
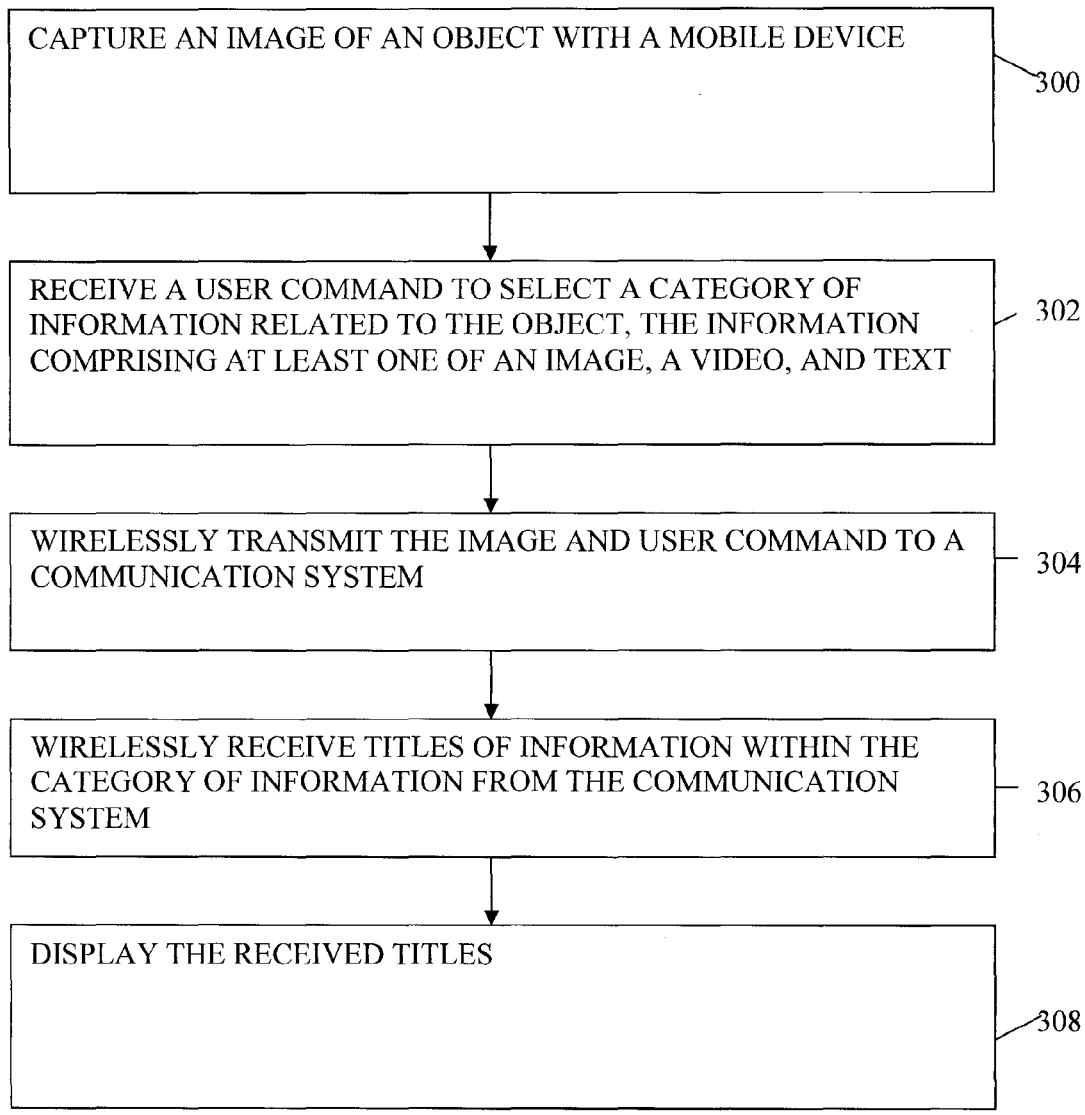
FIG. 3 illustrates a method of using the mobile unit of FIG. 1.

The communication system or network 140 may comprise any type of components configured to provide wireless communication with one or more mobile units 100. For example, the communication system 140 may comprise one or more base stations (BS) 141 (also called base station transceivers), base station controllers (BSCs) 142, mobile switching centers (MSCs) 143, packet data switch networks (PDSNs) 144, Internet servers 145, storage units, etc. The communication system 140 may use a multiple access technology, such as time division multiple access (TDMA), code division multiple access (CDMA), wideband CDMA (WCDMA), Global System for Mobile Communications (GSM), time-division synchronous CDMA (TD-SCDMA), etc. Alternatively, the communication system 140 may comprise "hotspots" (transceivers) for WiFi or WiMax. The communication system 140 may use communication protocols, such as packet data transmission protocols.

Mobile Unit

The mobile unit 100 may be a mobile phone, a pager, a personal digital assistant (PDA), a laptop computer, a digital camera or some other mobile device. The mobile unit 100 may be a commercially available device, such as a camera phone made by Nokia, Motorola, Samsung, LG Electronics, Ericsson, Kyocera, etc. Alternatively, the mobile unit 100 may be a modified commercially available device, e.g., a camera phone with added software 107. Alternatively, the mobile unit 100 may be a new mobile device designed to implement some or all of the functions described herein.

The mobile unit 100 may comprise a sensor 102, a processor 104, a memory 106, software 107, a database 116 of information, such as images, videos, text files and other data, a transceiver 108, a speaker 110, a microphone 112, a display 114, a keypad or other user input component 116, and an optional position location unit 118. The mobile unit 100 may include other components in addition to or instead of the components listed herein. The mobile unit 100 may include less than all of the components shown in FIG. 1. Some of the components in FIG. 1 may be integrated.

The keypad 116 may include one or more keys or buttons on various sides (front, rear, top, back, lateral, etc.) of the mobile unit 100 and are not limited to any one side. The keys or buttons are not limited to any material, arrangement or structure.

The sensor 102 may take or capture a snapshot image (picture) or a video of an object or text. The sensor 102 may be similar to standard image sensors in currently available camera phones, or the sensor 102 may be a specially designed image sensor. The sensor 102 may have a photodetector, such as a charge-coupled device (CCD) and/or complementary metal oxide semiconductor (CMOS) circuit. The sensor 102 may have a user-controlled zoom function or image magnification with one of the keys of the keypad 116. Alternatively, the zoom function or image magnification may be automatically controlled by the mobile unit 100. The sensor 102 may have a user-controlled or automatic focus function to focus on one or more objects.

User Commands—by Voice or Keypad

For any user-initiated functions on the mobile unit 100 described herein, the user may press one or more keys on the keypad 116 or speak a command into the microphone 112. For example, the user may press one or more keys on the keypad 116 and/or speak a command into the microphone 112 to activate the sensor 102, which senses or captures an image or picture of an object or text.

Examples of objects may include a car, a building, a monument, a person, an animal, a plant, a piece of clothing, jewelry, a poster, a billboard, a sign, an image on a TV, computer display or other display, a comic book, a stamp, a coin or other collectible. Examples of people include professional athletes, sports teams, musicians, actors/actresses, celebrities, politicians, etc.

Examples of text may include a sign, an address, a business card, a book, billboard, poster, etc. The sensor 102 and/or the processor 104 may convert the image of an object or text into data, such as digital data, e.g., a sequence of bits.

Before, during or after the sensor 102 is activated to capture an image of an object or text, the user may enter one or more commands via one or more keys on the keypad 116, the display 114 or microphone 112. Examples of user commands may include "find information related to object," "find info," "find definition," "find photo," "find video," "find related images," "find news," "find history," "find story," "find product," "buy," "sell," "find best deal," "find nearest store," "find seller," "find person," "find web site," "find email," "find address," "find phone number," "find nearest location," "get map," "find directions," "translate," and "translate in <language X>."

The user may enter at least one search word via one or more keys on the keypad 116 or say a word or phrase into the microphone 112. The search word(s) may help identify the object and/or narrow a search to find specific information related to the object. For example, the search word may be a name of the object or what the user believes is a name or brief description of the object.

In one configuration, the processor 104 may execute software 107 to search the database 116 and identify the object or text, retrieve related information, and display information on the display 114 or play audio files by the speaker 110.

In another configuration, the processor 104 may cause the transceiver 108 to transmit the image data and a user command to the server 150 via the communication system 140. The user command may be represented by a short sequence of bits. This configuration may save processing power and memory space on the mobile unit 100 compared to the configuration described above. The server 150 may process the command and send requested data to the mobile unit 100.

In another configuration, the processor 104 first executes software 107 to search the database 116 and try identifying the object or text. If the object or text cannot be identified, e.g., within a time period, the processor 104 then causes the transceiver 108 to transmit the image date and user command to the communication system 140.

The mobile unit 100 may automatically or upon a user input (e.g., user may dial a phone number or press one or more buttons on the keypad 116 or microphone 112) send the image data and user command to the communication system 140, which sends the image data and user command to the server 150. For example, the mobile unit 100 may send the image data to a base station 141, which sends the data to a base station controller (BSC) 142, which sends the data to a mobile switching center (MSC) 143, which sends the data to a packet data switching network (PDSN) 144, which sends the data to the server 150. Other communication routes between the mobile unit 100 and server 150 may involve more components, less components, or other components of the communication system 140.

Display

Figure 4:
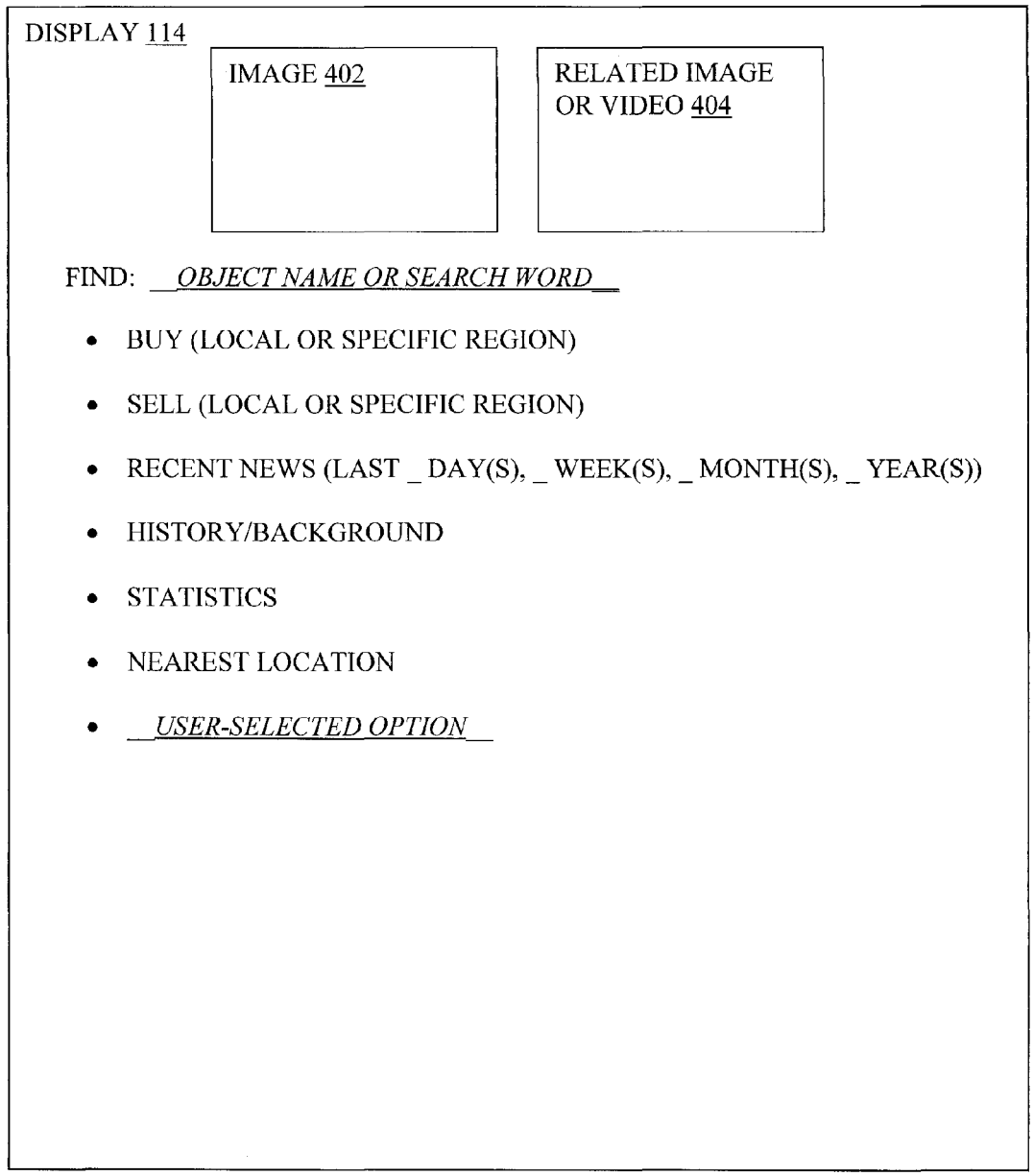
FIG. 4 illustrates an example of information that may be displayed on the mobile unit of FIG. 1.

FIG. 4 illustrates an example of some information that may be displayed on the display 114. All the information may not be displayed at one time on one screen. Some of the information may be displayed on different screens of the display 114. The screens may be switched or scrolled by user commands. The display 114 may display one or more pieces of information according to when user commands are received by the mobile unit 100. For example, the display 114 may show an image 402 when the user activates the sensor 102. The display 114 may show a search word if the user enters a search word. The display 114 may show an object name and/or related image or video 404 after a search occurred for the image 402.

As shown in FIG. 4, the display 114 may show information "options" (also called categories or types) related to the object, such as buy, sell, recent news, history or background, statistics, etc. These options may be displayed before a search and/or after a search. Displaying the options before a search may allow the user to select one or more categories of information and help narrow a search before the search occurs. A narrower search may provide one or more advantages, such as reducing search time, processing power, processing time, memory at the mobile unit 100 or server 150 to store search results, bandwidth and/or capacity of the communication system 140, mobile unit 100 and/or server 150, etc.

In addition to or instead of displaying these options before a search, the display 114 may show the options after a search occurs. These options allow the user to select one or more categories of information to display or audio or video files to play after a search. These options after a search may provide one or more advantages, such as reducing processing power, processing time, memory at the mobile unit 100 or server 150 to store search results, bandwidth and/or capacity of the communication system 140, mobile unit 100 and/or server 150, etc. Without these options, a large amount of bandwidth and capacity may be consumed to retrieve information for display or playback on the mobile unit 100.

The "buy" option may allow a user to buy an object in the image 402 or a product related to an object in the image 402. The buy option may be linked to a specific seller's web site or a web site such as Amazon.com or eBay. For example, if the image 402 shows a sports team, a musician or movie, the buy option may retrieve product links related to the a sports team, musician or movie, such as T-shirts, hats, other clothes, posters, compact discs, etc.

One or more options may be user-configurable or capable of being modified by the user. For example, the user may specify a local or specific region for buying or selling an object in the image 402. Examples of regions may include states, such as Virginia, Maryland or California, east coast, west coast, midwest, south, or one or more countries. The user may specify a time period for retrieving recent news such as within the last X days or Y weeks or Z months, etc. The user may specify a type of history, background or statistics. The order of the options displayed on the display 114 may also be configured or modified by the user.

As shown in FIG. 4, the user may enter or select the user's own option or category of information to retrieve related to the image 402.

Server

The computer or server 150 may be a single unit or multiple units, such as a distributed computer system. The server 150 may be at a single location or multiple locations. The server 150 may be coupled to the Internet 180 and/or data storage units 190.

The server 150 may have software, hardware or a combination of software and hardware to implement the functions described herein. The server 150 may include other components in addition to or instead of the components listed herein. Some or all of these components or functions may be implemented in the mobile unit 100.

The server 150 may include a transceiver 151, processor 152, a memory 154, a database 156, a search engine 158, an image processing module 160, an object identifier 161, a text recognition module 162, a language translation module 164, an information blocker 166, etc. These modules are shown and described herein as separate modules, but one or more of these modules may be combined or integrated. Although shown in the memory 154, the search engine 158, image processing module 160, object identifier 161, text recognition module 162, language translation module 164 and information blocker 166 may be implemented in whole or in part with hardware, such as application specific integrated circuits (ASICs).

The server 150 may receive image data and one or more user commands from the mobile unit 100, retrieve related data/information from the Internet 180 and/or data storage units 190, such as images, video and/or text (described below), and send the related data to the mobile unit 100 via the communication system 140. The server 150 may perform these functions in real time. The mobile unit 100 and server 150 may act as a quick dictionary, encyclopedia, reference source, or link to related information on the Internet 180.

The database 156 may store data, such as image files, video files and/or text files, which may be transmitted by the transceiver 151 and communication system 140 to the mobile unit 100. The database 156 may also store text data in more than one language.

Search Engine

The search engine 158 may search for web sites, hypertext links, text, and other data or structures on the Internet 180 that match or are related to the image of text from the mobile unit 100. The search engine 158 may be similar to search engines used by Yahoo, Google or a modified version of such search engines.

Image Processing Module

The image processing module 160 may process the image from the mobile unit 100 to clarify an object or text. For example, the image processing module 160 may enhance or focus one or more parts of an image, filter or remove non-relevant objects (such as shadows, rain, snow), increase or decrease contrast between light and dark areas, adjust brightness, adjust color, adjust focus, interpolate pixels to reduce the effects of blurs, reflections, remove red eye, etc. Other image processing functions may be known to the camera, video and image processing art, but combining image processing and other functions described herein are not known.

Object Identifier

The object identifier 161 may have one or more modules, which may be separate or integrated. The object identifier 161 may try to identify or recognize one or more objects of the image from the image processing module 160. The object identifier 161 may use the Internet 180 or the database 156 to try to find objects or information (images, videos, text) that match or are similar to the object in the image from the mobile unit 100.

The object identifier 161 may use object parameters such as shape (e.g., round, rectangular, oval, angular, sharp edges, curved edges, human face, shape of car, shape of commercial product), color, color pattern (e.g., monotone, spotted, striped, number of colors), surface texture (e.g., smooth, rough, reflective, furry, bumpy), material composition (e.g., metallic, wood, rock, plastic), arrangement, structure, facial features, spacing between lines or regions, size of an object relative to other objects, etc.

The object identifier 161 may use various levels of object classification to help identify an object. For example, one object classification may be whether the object is a living organism, such as a person, animal, plant, fungi, etc. or a non-living organism, such as a rock, vehicle, building, statue, sign, etc. The living organisms may further be classified as a person, animal, plant or fungi. People may be classified as professional athletes, sports teams, musicians, actors/actresses, celebrities, politicians, etc. The non-living organisms may further be classified as man-made or natural. Another object classification may be whether the object is inanimate. Another object classification may be whether the object is mechanical or electrical.

Text Recognition Module

The text recognition module 162 may categorize text by language (e.g., English, Chinese, Spanish) and style (e.g., cursive, font, numeric). Some text recognition techniques are known, such as character recognition machines available from Scantron Corporation of Irvine, Calif. Other text recognition techniques may be known to the camera, video and image processing art, but combining text recognition and other functions described herein are not known.

Examples of Retrieved Images, Videos, Texts Audio Files

The server 150 may transmit some or all of the information related to the original object or text to the mobile unit 100. To conserve communication bandwidth and display space, the server 150 may only send brief titles of information found by the server 150.

The mobile unit 100 may display the information, such as text, images or video, on the display 114, as shown in FIG. 4. To conserve communication bandwidth and display space, the mobile unit 100 may first display brief titles of information found by the server 150. The mobile unit 100 may provide music or audible sounds that describe the object or text, such as a voice recording defining, describing or translating the object or text.

Retrieved images may include a file, a photograph, a drawing, a computer-created graphic, a web site, a link to a website, a news story or a commercial advertisement, which may be displayed on the mobile device 100.

Retrieved videos may include a documentary, a news clip, a music video, a biography, a cartoon, an advertisement, etc.

Retrieved text may be a definition, a description of the object, one or more news articles, driving directions, geographic information, an advertisement, a language translation, etc. The display 114 may display a list of found categories of information or web site links, and the user may scroll through the categories or links.

Translation

In one embodiment, the server 150 may provide a language translation of the text, for example, from Chinese to English. Any language may be available to be selected by the user of the mobile unit 100. The mobile unit 100 may allow a user to select a desired language or set a default language for future translations.

Building a Database

The server 150 may build a database 156 of data (images, video files, audio files and text) related to objects and/or text by storing retrieved data from the Internet 180 and/or the storage units 190.

Information Blocker

A security or information blocker 166 may block certain information from being transmitted to the mobile unit 100 for privacy or safety issues. Examples may include names of non-famous people, personal phone numbers, email addresses, resident addresses, and other unauthorized information.

The functions described above may be implemented by hardware, software or a combination of hardware and software. Hardware may include a processor, a controller, application-specific integrated circuits (ASICs), field programmable gate arrays (FPGAs), etc.

A System, Method and Mobile Unit with a User Identifier and a Scannable Media to Store Credit or Debit Information The mobile unit 100 may be a cellular phone, a personal digital assistant (PDA), a laptop computer or some other mobile device.

The mobile unit 100 may include one or more ways to identify the user, such as a retina scanner, a fingerprint scanner, a voice scanner, a heart rate or pulse scanner, etc. For highest security, the mobile unit 100 may have more than one way to identify the user. Alternatively, for cost or size concerns, the mobile unit 100 may have only one way to identify the user.

The mobile unit 100 may require a user to identify himself or herself using one or more ways when the user activates the mobile unit 100 to perform one or more of the functions described below.

The mobile unit 100 may provide one or more functions of a person's wallet or purse or contents of a wallet or purse. For example, the mobile unit 100 may serve as a credit card, a debit card, a driver's license, a passport membership card, an insurance card, an identification card, a company security badge, a business card holder, a movie rental card, a library card, a health fitness membership card, a purchase receipt holder, etc. Thus, a user does not have to carry a wallet.

Also, a user does not have to worry about the wallet being stolen. If the mobile unit 100 is stolen, it is useless because the thief does not have the retina, fingerprint and/or voice of the user to activate the mobile unit 100.

The mobile unit 100 may have a medium to store credit, debit information or other information listed above. The medium may be a scannable medium, such as a bar code or a magnetic strip. The medium may be an internal medium, such as a memory and/or an integrated circuit, which is detectable or adapted to communicate with external scanners or communicators, such as grocery store checkout scanners.

The invention claimed is:

1. An apparatus comprising:
    a sensor configured to capture an image of an object;
    a processor configured to receive the captured image;
    a memory configured to store information comprising at least one of an image, a video, an audio file, and text;
    a display configured to display information; and
    a user interface configured to allow a user to control the sensor to capture the image, the processor to search for information related to the object in the memory, and the display to show information related to the object found by the processor; and
    a transceiver configured to (a) wirelessly transmit the captured image to a communication system and (b) wirelessly receive titles of information related to the object in the captured image from the communication system, the display being configured to display the titles received from the communication system, the user interface being configured to allow a user to select a title among the received titles, the display being configured to show information related to the selected title.

2. The apparatus of claim 1, wherein the user interface is configured to receive at least one search word from the user and send the word to the processor, the processor being configured to use the search word to search for information related to the object in the memory.

3. The apparatus of claim 1, wherein the titles comprise at least one of links to picture files, links to video files, links to text files, and links to web sites.

4. The apparatus of claim 1, wherein the user interface is configured to allow a user to select a category of information to receive from the communication system, wherein the category comprises at least one of a definition, a related image, a related video, news, history, purchase information, selling information, location, nearest store, person, web site, email, address, phone number, map, directions, and language translation.

5. The apparatus of claim 1, further comprising a position location unit, wherein the transceiver is configured to transmit a signal from the position location unit to the communication system.

6. The apparatus of claim 1, wherein the processor is configured to control the transceiver to transmit the captured image to the communication system if the processor cannot find information related to the object in the memory.

7. An apparatus comprising:
    a sensor configured to capture an image of an object;
    a transceiver configured to (a) wirelessly transmit the captured image to a communication system and (b) wirelessly receive information related to the object from the communication system;
    a display configured to show the received information; and
    a user interface configured to allow a user to control the sensor, the transceiver, and the display; and
    wherein the user interface is configured to receive at least one search word from the user, the transceiver being configured to send the search word with the captured image to the communication system, the search word being configured to narrow a search for information related to the object by the communication system.

8. The apparatus of claim 7, wherein the user interface comprises at least one of a touch screen menu on the display, a speaker, a microphone, and a voice recognition unit.

9. The apparatus of claim 7, further comprising a position location unit, wherein the transceiver is configured to transmit a signal from the position location unit to the communication system.

10. The apparatus of claim 7, wherein the user interface is configured to allow a user to select a category of information related to the object to receive from the communication system, the category comprising at least one of a definition, a related image, a related video, news, history, purchase information, selling information, location, nearest store, person, web site, email, address, phone number, map, directions, and language translation, wherein the information comprises at least one of an image, a video, an audio file, and text.

11. The apparatus of claim 7, wherein the display is configured to display received information comprising at least one of links to picture files, links to video files, links to text files, and links to web sites.

12. The apparatus of claim 7, wherein the sensor is configured to capture a video of the object.

13. The apparatus of claim 7, wherein the user interface is configured to initiate the sensor to capture the image of the object, the transceiver to wirelessly transmit the captured image to the communication system and wirelessly receive information related to the object from the communication system, and the display to show the received information with a single touch by the user.

14. The apparatus of claim 7, wherein the user interface is configured to allow a user to configure a category.

15. The apparatus of claim 7, further comprising a speaker configured to produce audible sounds that describe the received information.

16. A method comprising:
    capturing an image of an object at a mobile device;
    wirelessly transmitting the captured image from the mobile device to a communication system;
    wirelessly receiving information related to the object from the communication system at the mobile device;
    displaying the received information on the mobile device;
    receiving a search command via a user interface of the mobile device, the search command comprising at least one of a word, a category, a title, a location, and a type of information; and
    wirelessly transmitting the search command with the captured image from the mobile device to the communication system.

17. An apparatus configured to (i) receive a request from a device through a communication system, the request comprising data representing an image of an object, (ii) access at least one of a database, a search engine, and a data network to find information related to the object, the information comprising at least one of an image, a video, an audio file, text, a hypertext link, and a web site, and (iii) send titles of the found information through the communication system to the device.

18. The apparatus of claim 17, comprising a network of computers.

19. The apparatus of claim 17, the data network comprising an Internet.

20. The apparatus of claim 17, comprising at least one of a transceiver, processor, a memory, a database, a search engine, an image processing module, an object identifier, a text recognition module, a language translation module, and an information blocker.

21. The apparatus of claim 17, being configured to receive a request to block certain information from being sent through the communication system to the device.

22. The apparatus of claim 17, the information comprising data in a plurality of languages.

23. The apparatus of claim 17, being configured to find most popularly searched information related to the object.

24. The apparatus of claim 17, being configured to find information related to the object and a location of the device.

25. The apparatus of claim 17, being configured to find information in a category specified in the request, the category comprising at least one of a definition, a related image, a related video, news, history, purchase information, selling information, location, nearest store, person, web site, email, address, phone number, map, directions, and translation.

26. The apparatus of claim 17, being configured to use a search word in the request to find information related to the object.

27. The apparatus of claim 17, being configured to receive a second request specifying one or more titles of found information from the device and send found information of the specified title through the communication network to the device.

28. The apparatus of claim 17, being configured to process the image to clarify the object.

29. The apparatus of claim 17, being configured to process the image by performing at least one of enhancing, focusing, filtering, removing non-relevant objects, adjusting contrast between light and dark areas, adjusting brightness, adjusting color, adjusting focus, interpolating pixels to reduce the effects of blurs, reflections, and removing red eye.

30. The apparatus of claim 17, being configured to use parameters of the object to find information related to the object, the parameters comprising at least one of shape, features, color, color pattern, surface texture, material composition, arrangement, structure, facial features, spacing between lines, and size of the object relative to other objects.

31. The apparatus of claim 17, being configured to use a plurality of object classifications to find information related to the object.

32. The apparatus of claim 31, the classifications comprising at least one of people, products, and text.

33. An apparatus comprising:
a transceiver configured to receive a request from a device through a communication system, the request comprising data representing an image of text,
a processor configured to access at least one of a database, a search engine, and
a data network to find information related to the text in the image, the information comprising at least one of an image, a video, an audio file, related text, a hypertext link, and a web site, the transceiver being configured to send the found information through the communication system to the device; and
wherein the processor is further configured to categorize the text in the image into one of a plurality of languages and translate the text in the image from a first language to a second language, the transceiver being configured to send the translated text through the communication system to the device.

34. An apparatus comprising:
a sensor configured to capture an image of text;
a transceiver configured to (a) wirelessly transmit the captured image to a communication system and (b) wirelessly receive information related to the text from the communication system;
a display configured to show the received information; and
a user interface configured to allow a user to control the sensor, the transceiver, and the display; and
wherein the text is in a first language, the user interface being further configured to allow the user to select a second language for the text to be translated by the communication system, received by the transceiver, and at least one of displayed on the display and produced audibly by a speaker of the user interface.

35. A method comprising:
receiving a request from a device through a communication system, the request comprising data representing an image of an object;
accessing at least one of a database, a search engine, and a data network to find information related to the object, the information comprising at least one of an image, a video, an audio file, text, a hypertext link, and a web site; and
sending titles of the found information through the communication system to the device.

36. The method of claim 35, further comprising using parameters of the object to find information related to the object, the parameters comprising at least one of shape, features, color, color pattern, surface texture, material composition, arrangement, structure, spacing between lines, and size of the object relative to other objects.

37. The method of claim 35, further comprising performing at least one of enhancing, focusing, filtering, removing non-relevant objects, adjusting contrast between light and dark areas, adjusting brightness, adjusting color, adjusting focus, interpolating pixels to reduce the effects of blurs, reflections, and removing red eye.

38. An apparatus comprising:
a sensor configured to capture an image of an object;
a transceiver configured to (a) wirelessly transmit the captured image to a communication system and (b) wirelessly receive information related to the object from the communication system;
a display configured to show the received information; and
a user interface configured to allow a user to control the sensor, the transceiver, and the display; and
wherein the display is configured to display received information comprising titles of at least one of an image, a video, an audio file, and text.

39. The apparatus of claim 38, wherein the user interface is configured to allow a user to select a title among the received titles, the display being configured to show information related to the selected title.

* * * * *